United States Patent Office 3,544,663
Patented Dec. 1, 1970

3,544,663
FLUORINATED ORGANIC COMPOUNDS AND POLYMERS THEREOF
Murray Hauptschein, Glenside, and Robert Bonner Hager and Thomas Clark Allen, King of Prussia, Pa., assignors to Pennwalt Corporation, Philadelphia, Pa., a corporation of Pennsylvania
No Drawing. Filed Jan. 30, 1967, Ser. No. 612,315
Int. Cl. C08f 29/22, 37/18
U.S. Cl. 260—900    12 Claims

ABSTRACT OF THE DISCLOSURE

Disclosed herein are certain polymerizable acrylates containing perfluoroalkyl tails, homopolymers and copolymers thereof, means for preparing these compositions and methods of their use for treating textiles and related materials.

DESCRIPTION OF THE INVENTION

The invention is concerned particularly with polymers and copolymers of monomers derived from compounds having the structure

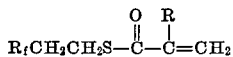

where $R_f$ is a perfluoroalkyl group containing from 5 to 13 carbon atoms and R is selected from the group consisting of hydrogen and methyl, and their use for treating textiles and the like (e.g. paper, leather, etc.).

It is known that polymerizable acrylates containing long-chain perfluoroalkyl end groups or "tails" in the molecule provide polymers that have exceptional resistance to wetting by both aqueous and oleaginous systems. Such polymers exhibit both hydrophobic and oleophobic effects because of the perfluoroalkyl portion of the molecule. Polymers of such acrylates are particularly useful in the form of latices for surface treatment of textiles, paper, and other fiber substrates to impart water and oil repellency; thus, making these materials resistant to staining by both aqueous and oil soils.

These perfluorinated materials, however, are generally of high cost. Therefore, it is important that they be effective in minimal amounts and much work has been undertaken toward tailoring the monomer molecule so as to obtain maximum performance of the water and oil repellency properties of the polymers and copolymers which may be prepared therefrom. It has been observed that not only does the perfluorinated portion of the molecule (especially its chain length) have an important influence on these properties, but that the remaining portion of the monomer molecule also may influence the same properties to a significant degree. Just how the configuration of the molecule influences the overall oil and water repellency characteristics of the polymer is not understood. It is possible that the arrangement of the hydrocarbon portion can affect the orientation of the perfluoroalkyl tails on the surface of the polymer and in this manner may modify the surface characteristics even where the fluorocarbon portion is constant in size and configuration. Whatever the explanation is, it has been found impossible to predict in advance the effect of modifications in the monomer.

In accordance with the present invention, it has been discovered that certain novel sulfur-containing acrylates provide polymers having remarkably superior surface properties as compared to similar acrylates which lack the sulfur atom. The sulfur-containing acrylate polymers of the invention are particularly superior with respect to their water repellent properties.

This superiority imparted by the sulfur-containing products of this invention is quite unexpected as is also the fact that the products impart no odor to the fabrics treated with them. Because of the nature of the

group in the molecule, it would be expected that highly odorous mercaptan and/or other sulfurous compounds would be formed. However, neither the acrylate monomers, their polymers, nor the washed and dried fabrics which contain the polymer show any evidence of odor during handling, storage, or treatment.

The monomeric acrylates of the invention have the structure shown above and the polymers, including homopolymers and copolymers, with other unethylenically unsaturated compounds, will contain the repeating unit of the following structure:

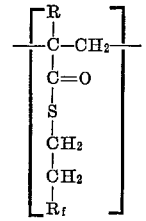

The acrylate monomer of the invention is prepared from the appropriate perfluoroalkyl iodide by a series of reactions which involves addition of 1 mole of ethylene to the iodide, which product is subsequently reacted with thiourea and the isothiuronium salt obtained hydrolyzed to the mercaptan. The mercaptan is then reacted with the appropriate acyl chloride to yield the acrylate monomer. Alternatively, the mercaptan may be prepared by addition of $H_2S$ to a perfluoroalkyl substituted $$(R_fCH=CH_2)$$

ethylene which in turn is made by dehydrohalogenation of $R_fCH_2CH_2X$ (X is halogen). The following examples illustrate the methods for making the compounds of the invention:

EXAMPLE 1—PREPARATION OF

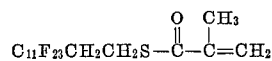

In a 1 liter flask is placed 100 g. (0.138 mole) of $C_{11}F_{23}CH_2CH_2I$, 12.6 g. (0.166 mole) of thiourea, and 100 ml. of 200 proof ethanol and the mixture heated to reflux for 5 hours. Then about 50 ml. of the ethanol is stripped off using vacuum. Then, 400 g. $H_2O$ and 11.04 g. (0.138 mole) of 50% aqueous NaOH is added and the reaction mixture is boiled. The mercaptan, $C_{11}F_{23}CH_2CH_2SH$, is collected in a Dean-Stark trap as a lower layer in 75.8% yield.

The material is purified by distillation; B.P. 63° C. at 0.2 mm. Hg M.P. 58–9° C.

A one liter flask equipped with stirrer, condenser, addition funnel and nitrogen atmosphere is charged with 250 ml. of benzene, 30.0 g. (0.286 mole) of methacrylyl chloride, and 0.15 g. of hydroquinone. A mixture of 22.6 g. (0.286 mole) of pyridine, 150 g. (0.237 mole) of $C_{11}F_{23}CH_2CH_2SH$, and 170 ml. benzene is added dropwise from the addition funnel over a 40 minute period. During this time the temperature is held at 30° C. with cooling. After 2 hours at room temperature the reaction mixture is refluxed for 5 hours and then cooled.

The by-product salt is filtered off and the filtrate concentrated by distillation. The residue is taken up in 400 ml. of 1,1,2 - trichlorotrifluoroethane and the solution washed 1× 100 ml. H₂O, 1× 100 ml. 5% HCl, 2× 100 ml. 5% NaOH, and 1× 100 ml. H₂O.

Removal of the volatile solvent followed by fractionation affords the desired product

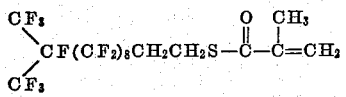

in 41% yield, 66 g., M.P. 39° C.; B.P. 94°/0.04 mm.

*Analysis.*—Calculated for $C_{17}F_{23}H_9SO$ (percent): C, 29.2; H, 1.29; S, 4.59; F, 62.6. Found (percent): C, 28.81; H, 1.55; S, 4.73; F, 62.3.

EXAMPLE 2—PREPARATION OF

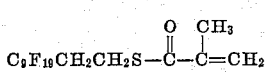

(A) Reaction of $C_9F_{19}CH=CH_2$ with hydrogen sulfide

The olefin $(CF_3)_2CF(CF_2)_6CH=CH_2$ is reacted with hydrogen sulfide at +5° C. at 200 p.s.i.g. H₂S, the molar ratio of H₂S to olefin being ca. 30:1, in a water-jacketed quartz tube irradiated with the ultraviolet light furnished by two 36″ germicidal lamps. One portion of the olefin is reacted in a static system for ¾ hour; the rest is passed continuously through the reactor at the rate of 1 g. olefin per minute. The H₂S is boiled out of the reaction product, which is then assayed by gas chromatography. Conversion of olefin to thiol ranges from five to ten percent, both under static and flow conditions.

The major product (92%) is $$(CF_3)_2CF(CF_2)_6CH_2CH_2SH$$

M.P. 25° C.

Calculated for $C_{11}H_5F_{19}S$, molecular weight 530; (percent): C, 24.92; H, 0.95; F, 68.1; S, 6.05. Found, molecular weight 532±3 (by mass spectroscopy); (percent). C, 24.94; H, 0.99; F, 68.2; S, 6.86.

Both NMR and mass spectra are in satisfactory agreement with the above structure.

(B) (Alternative method) $C_9F_{19}CH_2CH_2I$ reacted with thiourea and hydrolyzed to $C_9F_{19}CH_2CH_2SH$ In a 5 liter 3-neck R.B. flask equipped with a water-cooled condsenser, mechanical stirrer, and heating mantle, is placed 624 g. $(CF_3)_2CF(CF_2)_6CH_2CH_2I$ (1.0 mole, 2660–47–2), 114 g. thiourea (1.5 mole, B. & A. Reagent), and 3 liters of absolute ethanol. The reaction mixture, homogeneous at 55° C., is heated to reflux for 26 hours. The ethanol is then distilled off through a 10″ x 1″ diameter packed column, while adding water to the pot to keep its volume constant; a total of 3325 ml. of aqueous ethanol is removed. A solution of 40 g. NaOH (1.0 mole) in 200 ml. water is then added to the pot. The product is then co-distilled with water into a phase separator, the upper (aqueous) phase being returned to the pot. A total of 466 g. of crude product is thus collected. Distillation of 462 g. of crude gives 446g. of pure $$(CF_3)_2CF(CF_2)_6CH_2CH_2SH$$

B.P. 50° C. at "full pump" (ca. 0.1 mm. Hg).

(C) Preparation of 2-(perfluoro-7-methyloctyl)-ethyl thiolmethacrylate

A two-liter flask equipped with stirrer, condenser, addition funnel and nitrogen atmosphere is charged with 1200 ml. of benzene and the solvent distilled through the system to remove all traces of water. After cooling to room temperature, 300 g., 0.554 mole, of 2-(perfluoro-7-methyloctyl)ethyl mercaptan, 84.4 g., 0.83 mole, of triethylamine, and 1.0 g. of hydroquinone is added to the flask. Methacrylyl chloride, 86.8 g., 0.83 mole, is slowly added over a 25-minute period from the addition funnel while maintaining the temperature below 30°. After addition is complete the reaction mixture is refluxed for three hours and then cooled to room temperature. The salt by-product is filtered off and the filtrate diluted with 300 ml. of ether. This solution is washed with 1× 250 ml. water, 1× 250 ml. 5% HCl, 1× 250 ml. water, and 3× 200 ml. 10% NaOH. After drying, the solvent is removed under vacuum and the residue dissolved in 1,1,2-trichlorotrifluoroethane and washed 5× 10% NaOH to remove hydroquinone. Removal of the solvent affords 243 g. of residue. To this is added 0.05 g. of N,N'-diphenyl-p-phenylenediamine and the product fractionated to give 138 g. of

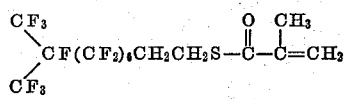

B.P. 83°/0.1 mm., 41% yield.

*Analysis.*—Calculated for $C_{15}F_{19}H_9SO$ (percent): C, 30.1; H, 1.51; S, 5.35; F, 60.2. Found (percent): C, 30.7; H, 1.78; S, 6.05; F, 58.3.

EXAMPLE 3—PREPARATION OF

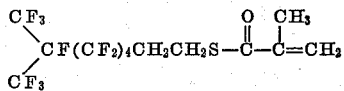

Using the procedures set of in Examples 1 and 2, the compound

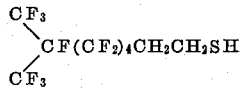

is prepared. This is reacted with methacrylyl chloride to yield a product of structure

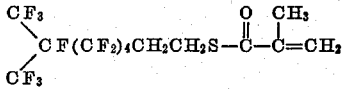

Boiling point of the product is 74° C./0.3 mm.

*Analysis.*—Calculated for $C_{13}F_{15}H_9SO$ (percent): C, 31.3; H, 1.82; S, 6.43; F, 57.2. Found (percent): C, 31.0; H, 1.81; S, 6.69; F. 57.5. $n_D^{25}$=1.3755.

EXAMPLE 4—PREPARATION OF

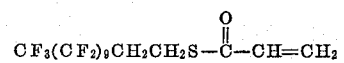

Following the details of Example 2B, but using $$CF_3(CF_2)_9CH_2CH_2I$$

as the starting iodide, the mercaptan is obtained which is reacted as in Example 2C with acrylyl chloride to yield the product of structure

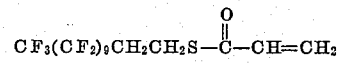

EXAMPLE 5—PREPARATION OF

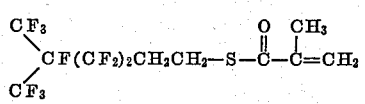

Using the procedure outlined in Example 2, but starting with

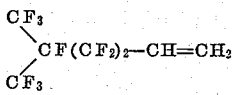

the mercaptan is obtained and is converted by reaction with methacrylyl chloride to

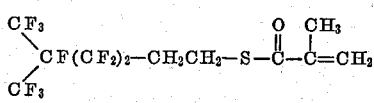

EXAMPLE 6

In like manner, the following monomers are prepared and form part of this invention:

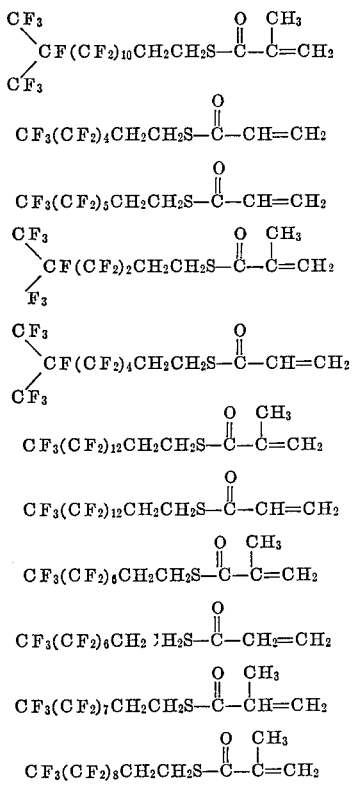

The acrylate monomers of the invention may be homopolymerized or copolymerized with other ethylenically unsaturated comonomers by conventional polymerization techniques which will include emulsion polymerization, suspension polymerization, solution polymerization, or bulk polymerization.

The preferred polymerization technique is emulsion polymerization in an aqueous medium. According to this technique, the monomer is charged to a polymerization vessel (preferably equipped with a stirrer or other type of agitator, heating and/or cooling means) together with water, which is preferably deoxygenated and deionized, a polymerization catalyst, and a surfactant to stabilize the emulsion such that the polymer is obtained in the form of an aqueous latex. If desired, other additives may be used in the polymerization recipe, such for example, as water soluble organic solvents, such as acetone, ethyl alcohol, methyl alcohol, ethylene glycol, and the like, chain transfer agents such as mercaptans, carbon tetrachloride, carbon tetrabromide, and the like, crosslinking monomers such as alkylene glycol dimethacrylates, allyl methacrylate, divinylbenzene and the like, and inorganic salts such as chlorides, acetates, carbonates, phosphates, and borates to serve as buffers and electrolytes.

Suitable polymerization catalysts include generally those commonly used for the polymerization of acrylic monomers such, for example, as potassium persulfate, ammonium persulate, hydrogen peroxide, barium peroxide, sodium peroxide, or organic catalysts such as 2,2'-azodiisobutyramidine dihydrochloride, 2,2'-azodiisobutyronitrile, 2,2'-azobis(2,4-dimethyl-4-methoxyvaleronitrile, 2,2'-azodiisobutyramidoxime dihydrochloride, ditertiary butyl peroxide, tertiary butyl hydroperoxide, benzoyl peroxide, tertiary buty peracetate, tertiary butyl perbenzoate, acetyl peroxide, 2,4-dichlorobenzoyl peroxide, disuccinic acid peroxide, cumene hydroperoxide, dicumyl peroxide, lauroyl peroxide, methyl ethyl ketone peroxide, di(hydroxyheptyl) peroxide, and myristoyl peroxide. Such polymerization catalysts will generally be used in concentrations ranging between 0.01 and 3% and preferably between 0.1 and 2% by weight based on the weight of the monomer.

Suitable surfactants or emulsifying agents include generally those of the cationic, anionic, nonionic, or amphoteric types. The nonionic types are generally preferred when the final product may be diluted with other ionic materials. However, the cationic types can be used in most textile treating baths and, in some cases, may be preferred due to their substantive effect on cellulose. The hydrophobic portion of the surfactant may be hydrocarbon or may be fluorinated. Suitable surfactants that may be used include, for example, nonionic surfactants in which the hydrophilic group is a poly(ethoxy) group and the hydrophobic portion is either a hydrocarbon or a fluorocarbon group such as the ethylene oxide condensates of alkyl phenols, alkanols, alkyl amines, alkyl thiols, alkyl carboxylic acids, fluoroalkyl carboxylic acids, fluoroalkyl amides, fluoroalkyl amines, fluoroalkyl thiols, and the like. Suitable nonionic surfactants include, e.g., those of the types

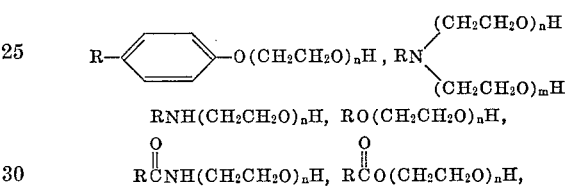

where R is an alkyl radical having 8 to 22 carbon atoms and $n$ and $m$ is an integer from 1 to 100; and those of the type

where $R_f$ is a perfluoroalkyl or perfluorochloroalkyl radical having from 4 to 18 carbon atoms and where $n$ is an integer from 1 to 50. Specific examples of suitable nonionic surfactants include, e.g.,

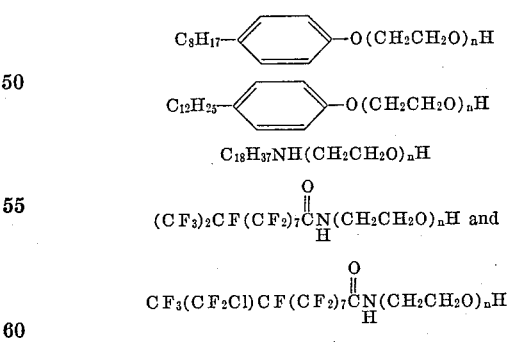

where $n$ is an integer having an average value of about 4 to 50.

Suitable anionic surfactants include, e.g., those in which the hydrophillic group is

—$OSO_3M$; —$OPO_4M$; —$(CH_2CH_2O)_nSO_3M$, where M is $NH_4^+$, $K^+$, $Na^+$, or the like; and where the hydrophobic portion is a long chain alkyl group, higher alkyl substituted benzene or naphthalene group or a fluoroalkyl group having from 4 to 18 carbon atoms, such for example, as $$C_{12}H_{25}OSO_3Na,$$

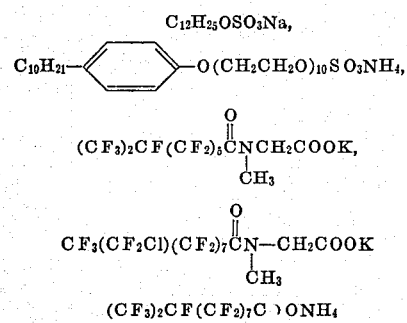

$$(CF_3)_2CF(CF_2)_7CO \cdot ONH_4$$

and

Suitable cationic surfactants include, e.g., quaternary ammonium salts or amine salts containing at least one long chain alkyl, fluoroalkyl or higher alkyl substituted benzene or naphthalene group to provide the hydrophobic portion, such for example as

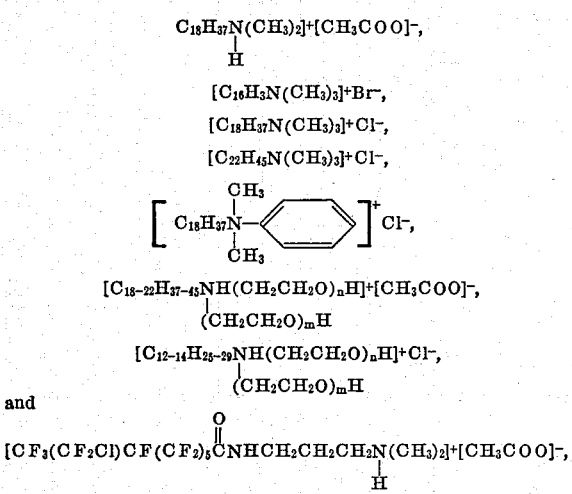

and $$[CF_3(CF_2Cl)CF(CF_2)_5\overset{O}{\overset{\|}{C}}NHCH_2CH_2CH_2\overset{+}{N}(CH_3)_2]^+[CH_3COO]^-,$$
$$\underset{H}{|}$$

The polymerization is preferably carried out for a reaction period adjusted to obtain essentially quantitative conversion of the fluorinated acrylate monomer. The optimum reaction time will depend upon the catalyst used and the polymerization temperature and other conditions, but will generally be in the range of from 0.5 to 24 hours. The polymerization temperature will depend upon the catalyst chosen. In the case of emulsion polymerization in aqueous media it will generally be in the range of from 20° to 100° C. The polymerization is most conveniently and generally preferably carried out at atmospheric pressure.

Comonomers suitable for copolymerizing with the fluorinated acrylates of the invention include generally ethylenically unsaturated compounds particularly those containing a terminal ethylenic linkage. Suitable comonomers may include, for example, those containing relatively long-chain perfluoroalkyl groups. For instance, a mixture of two or more of the fluorinated sulfur containing acrylates of the invention which may differ from one another, e.g. in the length of the perfluoroalkyl chain, may be copolymerized. Similarly, the fluorinated sulfur containing acrylates of the invention may be copolymerized with other monomers containing perfluoroalkyl chains such, for example, as

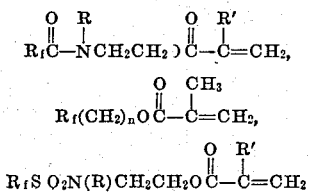

$$R_f(CH_2)_nO\overset{O}{\overset{\|}{C}}-\overset{CH_3}{\underset{|}{C}}=CH_2,$$

$$R_fSO_2N(R)CH_2CH_2O\overset{O}{\overset{\|}{C}}-\overset{R'}{\underset{|}{C}}=CH_2$$

where $n$ is an integer from 1 to 6, $R_f$ is a perfluoroalkyl radical containing from 4 to 18 carbon atoms, R is alkyl of 1 to 10 carbon atoms, and where R' is H or $CH_3$.

Examples of other ethylenically unsaturated monomers suitable for copolymerization with the fluorinated sulfur containing acrylates of the invention include butadienes such as 1,3-butadiene, 2-chloro-1,3-butadiene, 2-methyl-1,3-butadiene, 2,3-dichloro-1,3-butadiene; acrylic and methacrylic acids and their esters and amides such as methyl acrylate, methyl methacrylate, ethyl acrylate, ethyl methacrylate, butyl acrylate, butyl methacrylate, ethylbutyl methacrylate, hexyl acrylate, isoamyl acrylate and methacrylate, butoxyethyl acrylate and methacrylate, hexyl methacrylate, ethylhexyl acrylate, ethylhexyl methacrylate, 3,5,5-trimethylhexyl acrylate and methacrylate, octyl acrylate, octyl methacrylate, decyl acrylate, decyl methacrylate, lauryl acrylate, lauryl methacrylate, tridecyl acrylate, tridecyl methacrylate, 2,6,8-trimethyl-4-nonyl methacrylate, stearyl acrylate, stearyl methacrylate, hydroxyethyl and hydroxypropyl methacrylate, t-butylaminoethyl methacrylate, dimethylaminoethyl methacrylate, 2-hydroxy-3-methacryloyloxypropyltrimethylammonium chloride, glycidyl acrylate, glycidyl methacrylate, acrylamide, methacrylamide, N-methylol acrylamide, N-methylol methacrylamide, N-isopropyl acrylamide, N-isopropyl methacrylamide, and the like; vinyl halides such as vinyl chloride, vinyl fluoride, vinylidene chloride, vinylidene fluoride, tetrafluoroethylene, and the like; vinyl esters, such as vinyl acetate, vinyl butyrate, vinyl laurate, vinyl stearate, and the like; vinyl alkyl ketones such as vinyl methyl ketone, vinyl ethyl ketone, and the like; vinyl ethers such as methyl vinyl ether, cetyl vinyl ether, octadecyl vinyl ether, styrene, alkyl styrene, vinyl silicates, maleic anhydride, maleic acid and the esters and amides thereof; fumaric acid and the esters and amides thereof; itaconic acid and the esters and amides thereof; crotonic acid and the esters and amides thereof; allylamine, allyl alcohol, allyl esters and ethers, acrylonitrile and methacrylonitrile.

The copolymers of the fluorinated sulfur containing acrylates with a fluorine free acrylate as described above are a preferred embodiment of the invention.

The following examples illustrate the polymerization techniques described above:

EXAMPLE 7—HOMOPOLYMERIZATION OF

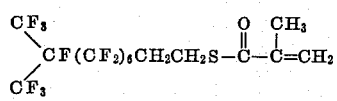

A solution of 2.5 g. of the above monomer in 1.6 g. of acetone is placed in a 7 oz. glass bottle. To this is added 0.1 g. 60% methylolacrylamide, 7.5 g. of deoxygenated water, 0.12 $C_{16}H_{33}N^+(CH_3)Br$ (Acetoquat CTAB) and 0.05 g. of 2,2'-azodiisobutyramidine dihydrochloride. The bottle is filled with nitrogen, capped, and placed in a tumbler submerged in a constant temperature bath. After 4 hours at 70° a latex is obtained with virtually no precoagulum formation.

EXAMPLE 8—HOMOPOLYMERIZATION OF

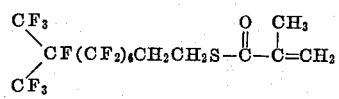

The same recipe and procedure described in Example 7 is followed except that the surfactant is 0.125 g. of

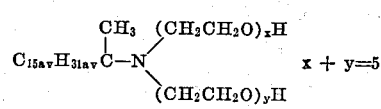

(Ethomeen L15/15) plus 0.072 g. of glacial acetic acid.

EXAMPLE 9—COPOLYMERIZATION OF

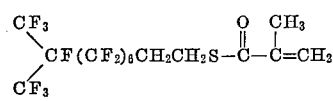

WITH OCTADECYL ACRYLATE

The same recipe and procedure described in Example 8 is followed except that the monomers charged are 2.0 g. of the fluorinated monomer and 0.5 g. of octadecy acrylate.

As already indicated, the polymers of the invention are highly effective for imparting oil and water repellent properties to substrates to which they are applied and coatings of these polymers may be prepared by any of the well-known techniques. When prepared by bulk or suspension polymerization techniques, these polymers may be applied, for example, from a dilute solution in suitable solvents such as the fluoroalkanes, fluorochloroalkanes, fluoroalkyl substituted aromatics, alkyl esters of perfluoroalkanoic acids, chlorinated alkanes or aromatics, hydrocarbon aromatics, ketones, esters, and ethers. Concentrations of the fluorinated polymer in the solvent to provide coatings with effective oil and water repellency properties will generally be of the order of 0.01 to 10% and preferably from 0.1 to 1.0% by weight. If the polymer is obtained as an aqueous latex or emulsion, the polymer coating may be applied by diluting the latex concentrate obtained from a polymerization with water or other liquid diluting agent to obtain diluted latex or dispersion usually of the order of from 0.01 to 10% by weight of the polymer and preferably from 0.1 to 1.0% by weight based on the total weight of the diluted latex.

The polymer solution or latex may be applied by any of the known techniques such as by dipping, spraying, brushing, padding, roll coating or by any desired combination of such techniques. The optimum method of application will depend principally on the type of substrate being coated.

Coatings of the fluorinated polymers of the invention may be applied to any desired substrate, porous or non-porous. They are particularly suited for application to porous materials such as textiles, leather, paper, wood, masonry, unglazed porcelain and the like to provide valuable oil and water repellency properties. However, they may also be applied to non-porous materials such as metals, plastics, glass, painted surfaces and the like to provide similar oil and water repellency properties.

For application to textile materials such as fabrics (woven and non-woven, fibers, films, yarns, cut staple, thread, etc., or articles made from fabrics, fibers, films, yarns, etc., the polymers of the invention are preferably prepared as aqueous latices or emulsions which are then diluted, preferably with water, and applied to the textiles from pad baths, which may contain other treating materials. In accordance with this standard technique, the fabric or the textile material is passed through the bath, passed through squeeze rolls adjusted to leave the desired amount of the polymer latex on the fabric, dried at a temperature of about 25 to 170° C. and then cured in a curing oven at a temperature in the range of from 140 to 195° C. for 0.2 to 20 minutes. The weight of fluorinated monomer deposited on the fabric may range, for example, from 0.01 to 10%. Preferably, very small amounts are used, generally in the range of from 0.1 to 0.5% to give high degrees of water and oil repellency. Any types of textile materials, such as cotton, wool, fiber glass, silk, regenerated cellulose, cellulose esters, cellulose ethers, polyesters, polyamides, polyolefins, polyacrylonitrile, polyacrylic esters, inorganic fibers, etc., either alone or blended in any combination, may be successfully coated with the fluorinated polymers of the invention.

It will be often advantageous to use the fluorinated acrylate homopolymers or copolymers of the invention in combination with other resins, polymers, crease-proofing agents, softeners, sizes, water repellents, etc. It is particularly advantageous to employ mixtures of emulsions of the fluorine-containing acrylate polymers or copolymers of the invention with separately prepared emulsions of other polymers or copolymers. The other polymer or copolymer is preferably of a non-fluorinated variety. Non-fluorinated polymers and copolymers suitable for admixture with the fluorinated polymers of the invention include, in particular, polymers and copolymers obtained from monomers of the alkyl acrylates and alkyl methacrylates, such as methyl methacrylate, ethyl methacrylate, isopropyl methacrylate, butyl methacrylate, 2-ethylbutyl methacrylate, isobutyl methacrylate, isoamyl methacrylate, butoxyethyl methacrylate, hexyl methacrylate, heptyl methacrylate, 2-ethylhexyl methacrylate, 3,5,5-trimethylhexyl methacrylate, n-octyl methacrylate, isooctyl methacrylate, decyl methacrylate, isodecyl methacrylate, lauryl methacrylate, tridecyl methacrylate, 3,6,8-trimethyl-4-nonyl methacrylate, stearyl methacrylate, cyclohexyl methacrylate, hydroxyethyl methacrylate, hydroxypropyl methacrylate, t-butyl amino ethyl methacrylate, dimethylaminoethyl methacrylate, 2 - hydroxy - 3 - methacryloyloxypropyltrimethylammonium chloride, glycidyl methacrylate, ethyl acrylate, isopropyl acrylate, butyl acrylate, 2-ethylhexyl acrylate, n-hexyl acrylate, n-octyl acrylate, decyl acrylate, lauryl acrylate, and stearyl acrylate. Also useful are polymers and copolymers obtained from monomers of acrylic acid, methacrylic acid, styrene, alkyl styrene, butadiene, 2-methyl-1,3-butadiene, 2-chloro-1,3-butadiene, 2,3-dichloro-1,3-butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride, chlorotrifluoroethylene and tetrafluoroethylene; polymers and copolymers of allyl esters such as allyl propionate, or allyl caprylate; polymers and copolymers of vinyl ketones such as vinyl methyl ketone, vinyl ethyl ketone and the like; polymers and copolymers of vinyl ethers such as methyl vinyl ether, cetyl vinyl ether, octadecyl vinyl ether and the like; polymers and copolymers of acrylamide, methacrylamide, N-methylol acrylamide, N-methylol methacrylamide, N-isopropylacrylamide; and acrylonitrile and methacrylonitrile.

The preferred compositions are those which contain 7 to 11 carbon atoms in the perfluorocarbon chain and mixtures of these compositions are particularly preferred.

In order to evaluate the polymers of the invention, the compositions were padded onto 80 x 80 cotton test cloth to 100% wet pickup, the swatches dried 3 minutes at 110° C. and then cured for 3 minutes at 170° C. Oil repellency values were assigned on the basis of the tests described in U.S. Ser. No. 529,937, now U.S. Pat. 3,304,278. Water repellency values were obtained from the AATCC Standard Test Method 22–1952 of the American Association of Textile Chemists and Colorists The rain test used in the examples is the method AATCC–35–1964.

The following example illustrates the superiority of the sulfur containing fluoroacrylate monomer over the oxygen analog.

EXAMPLE 10

| Fluorinated latex used at 0.5% solids in pad bath | Water repellency values |
|---|---|
| Polymer of $(CF_3)_2CF-(CF_2)_6CH_2CH_2S\overset{O}{\overset{\|}{C}}-CH=CH_2$ | 100 |
| $(CF_3)_2CF-(CF_2)_6CH_2CH_2O\overset{O}{\overset{\|}{C}}-CH=CH_2$ | 80 |
| A mixture of polymers of $(CF_3)_2CF(CF_2)_nCH_2CH_2S\overset{O}{\overset{\|}{C}}-CH=CH_2$ | 100 |

NOTE.—Where $n=4(40\%); 6(40\%); 8(20\%)$.

As can be seen from the above example the sulfur containing acrylate latex results in superior water repellent values.

In commercial use, however, one would rarely use the fluorocarbon acrylate polymer alone, but as pointed out above, it is particularly desirable to use the fluorine containing acrylate polymers or copolymers of the invention with separately prepared non-fluorinated polymer or copolymer emulsions, and in particular with alkyl acrylate and alkyl methacrylate polymer latices. The extraordinarily effective properties of such mixtures is illustrated by the following example.

EXAMPLE 11

(A) Fluorinated latex

The following ingredients are used to make the latex:

|  | Grams |
|---|---|
| $C_9F_{19}CH_2CH_2S\overset{O}{\underset{\|}{C}}\overset{CH_3}{\underset{\|}{C}}=CH_2$ | 8.0 |
| Stearyl methacrylate | 2.0 |
| 60% aqueous solution of methylolacrylamide | 0.83 |
| Amine surfactant ("Ethomeen" L15/15) | 0.5 |
| Glacial acetic acid | 0.3 |
| Deoxygenated deionized water | 30.0 |
| Catalyst (azodiisobutyramidine dihydrochloride) | 0.2 |

All of the above are mixed and passed through a hand homogenizer four times, placed in a flask and held in an oil bath at 100 to 110° C. with gentle agitation for 3 hours to polymerize.

(B) Non-fluorinated latex

The following ingredients are used to make this latex:

|  | Grams |
|---|---|
| Butyl methacrylate | 200 |
| 60% aqueous solution of methylolacrylamide | 24 |
| Amine surfactant ("Ethomeen" L15/15) | 10 |
| Acetic acid | 6 |
| Water | 500 |
| Catalyst (azodiisobutyramidoxime) | 4 |

The above are mixed in a flask at 70° C. and polymerized over a 4 hour period.

(C) Application to fabric

Bleached, mercerized combed 160 cotton twill is padded through a bath at 100% pick-up containing:

|  | Percent |
|---|---|
| Non-fluorinated latex (on polymer solids) | 0.6 |
| Fluorinated latex (on polymer solids) | 0.4 |
| Crease proofing resin ("Permafresh" 183; Sun Chemical) | 10 |
| 33% aqueous $Zn(No_3)_2$ solution | 4 |
| Extender ("Norane" F; Sun Chemical) | 5 |

The fabric is dried at 110° C. 5 minutes, then is cured at 170° C. for 5 minutes.

Initial repellencies: oil: 100; spray: 100; rain test: 1.0 g. at 2 ft. 5 minutes.

After 5 launderings and 5 tumble dryings using a normal wash with hot water setting and 0.1% detergent ("Tide").

Not ironed: oil: 80; spray: 100; ironed: oil: 110; spray: 100; rain test: 0.9 g. at 2 ft. 5 min.

As can be seen by the above data, the composition is an excellent repellent and maintains repellency after numerous laundering and drying cycles. It is understood in the art that the normal ironing procedure is helpful in bringing up the repellency of the washed fabrics. Particular attention is called to the rain test data which is a particularly severe test and it is seen that in this test the fabric treated with this repellent composition is exceptionally good.

Additional data with the compositions of this invention and comparisons with compositions and fluorocarbon acrylates devoid of sulfur are shown in the following examples.

EXAMPLE 12—PREPARATION OF NON-FLUORINATED ACRYLATE LATEX-HOMOPOLYMERIZATION OF N-DECYLMETHACRYLATE

A large resin flask is charged with 450 g. of deoxygenated water, 10 of surfactant ("Ethomeen" L15/15), 6 g. glacial acetic acid, 10 g. 60% aqueous N-methylolacrylamide, and 200 g. decyl methacrylate. To this is added 4 g. 2,2'-azodiisobutyramidine dihydrochloride dissolved in 40 g. of water. Polymerization is carried out at 70° C. with gentle stirring for 6 hours. A latex having 24% solids is obtained along with 26 g. of polymer scrap which is discarded.

Additional polymers of the fluoroacrylate monomers of the invention are prepared in accord with the following examples:

EXAMPLE 13—COPOLYMERIZATION OF

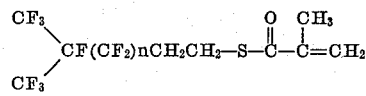

WHERE n=4, 6 & 8

The same recipe and procedure described in Example 8 is followed except that instead of the monomer in that example 1 g. (40%) of the acrylate where n= 4, 1 g. (40%) of the acrylate where n=6, and 0.5 g. (20%) of the acrylate where n= 8 is used.

EXAMPLE 14—HOMOPOLYMERIZATION OF

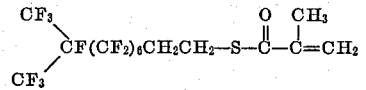

The same recipe and procedure as in Example 8 is used except that the amount of N-methylol acrylamide is doubled.

EXAMPLE 15—COPOLYMERIZATION OF

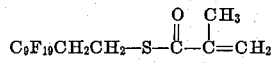

WITH CETYL VINYL ETHER

The same procedure as Example 9 is used except amount of N-methyolacrylamide is doubled and cetyl vinyl ether is substituted for octadecyl acrylate.

EXAMPLE 16—COPOLYMERIZATION OF

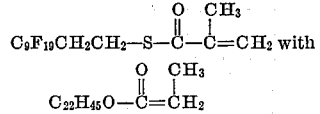

The same procedure and recipe as Example 15 is used except that

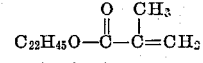

is substituted for cetyl vinyl ether.

EXAMPLE 17—COPOLYMERIZATION OF

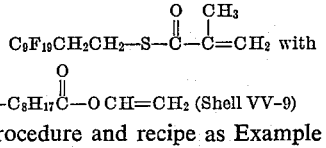

The same procedure and recipe as Example 15 is used using Shell VV–9 as the comonomer with

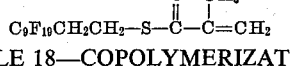

EXAMPLE 18—COPOLYMERIZATION OF

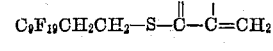

WITH n-DECYL METHACRYLATE

The same procedure and recipe as Example 15 is employed.

The following Table I indicates the results obtained by applying the above latices to cotton test cloth and evaluating the repellency effects:

In the above Table I particular attention is called to the comparison between Examples 19 and 20 and Examples 21 and 22. As can be seen from a study of the table, Example 19 employs a fluorinated latex which is a homopolymer of the sulfur containing acrylate of this invention and the oil and water repellency of the formulation is

TABLE 1A
[Mixture of polymer latex applied to cloth]

| Example No.: | Fluorinated latex (Percent solids in pad bath) | Non-fluorinated latex (percent solids in pad bath) |
|---|---|---|
| 19 | Homopolymer of: $(CF_3)_2CF(CF_2)_6CH_2CH_2S-\overset{O}{\underset{\|}{C}}-\overset{CH_3}{\underset{\|}{C}}=CH_2$ (0.2) | [1] (0.8) |
| 20 | Homopolymer of: $(CF_3)_2CF(CF_2)_6CH_2CH_2O-\overset{O}{\underset{\|}{C}}-\overset{CH_3}{\underset{\|}{C}}=CH_2$ (0.2) | [1] (0.8) |
| 21 | Homopolymer of: $(CF_3)_2CF(CF_2)_6CH_2CH_2S-\overset{O}{\underset{\|}{C}}-\overset{CH_3}{\underset{\|}{C}}=CH_2$ (0.4) | [2] (0.6) |
| 22 | Homopolymer of: $(CF_3)_2CF(CF_2)_6CH_2CH_2O-\overset{O}{\underset{\|}{C}}-\overset{CH_3}{\underset{\|}{C}}=CH_2$ (0.4) | [2] (0.6) |
| 23 | Copolymer of: $(CF_3)_2CF(CF_2)_nCH_2CH_2S\overset{O}{\underset{\|}{C}}-\overset{CH_3}{\underset{\|}{C}}=CH_2$ where n=4, 6, & 8 (0.2) | [1] (0.8) |
| 24 | Homopolymer of: $(CF_3)_2CF(CF_2)_6CH_2CH_2S\overset{O}{\underset{\|}{C}}-\overset{CH_3}{\underset{\|}{C}}=CH_2$ (0.2) | [1] (0.8) |

[1] Homopolymer of n-decylmethacrylate.
[2] Homopolymer of 3,5,5-trimethylhexyl-methacrylate.

TABLE IB

| | | Repellency ratings | |
|---|---|---|---|
| Additives used (percent on bath) | Initial oil/water | 5 washes—not ironed, oil/water | 5 washes—ironed, oil/water |
| Example No.: | | | |
| 19 ......... None ............ | 120/90 | | |
| 20 ......... None ............ | 100/80 | | |
| 21 ......... Permafresh 183 (10%); Norane F (5%); Zn(NO$_3$)$_2$ (1.3%). | 130/100 | 50/80 | 110/90+ |
| 22 ......... do ............ | 120/100 | 0/70 | 90/70 |
| 23 ......... None ............ | 120/100 | | |
| 24 ......... None ............ | 120/100 | | | significantly superior to the formulation tested under identical conditions where the fluorinated homopolymer lacks the sulfur atom and is instead a homopolymer of the analogous oxygen compound. In a similar fashion the sulfur containing homopolymer of Example 21 is vastly superior to the analogous homopolymer of the Examples 22 which lacks the sulfur atom. It will be seen from these examples also that this effect carries through with and without the use of additives in the formulation, which additives are normally used by the skilled art worker in the preparation of commercial repellent formulations.

In the following Table II additional examples are given to show the use of copolymers in their application to textiles for repellent effects.

TABLE II

| Example No. | Fluorinated latex (percent solids in pad bath) | Non-fluorinated latex (percent solids in pad bath) | Additives used (percent on bath) | Initial repellency, oil/water |
|---|---|---|---|---|
| 25 | Copolymer of: $C_9F_{19}CH_2CH_2S\overset{\underset{\|}{O}}{C}-\overset{\underset{\|}{CH_3}}{C}=CH_2$ with $C_{22}H_{45}O\overset{\underset{\|}{O}}{C}-\overset{\underset{\|}{CH_3}}{C}=CH_2$ (0.4) | (¹) | Same as Example 21 | 140/100 |
| 26 | Copolymer of: $C_9F_{19}CH_2CH_2S\overset{\underset{\|}{O}}{C}-\overset{\underset{\|}{CH_3}}{C}=CH_2$ with $t-C_8O_{17}\overset{\underset{\|}{O}}{C}-O-CH=CH_2$ (0.4) | ¹ (0.6) | do | 110/100 |
| 27 | Copolymer of: $C_9F_{19}CH_2CH_2S\overset{\underset{\|}{O}}{C}-\overset{\underset{\|}{CH_3}}{C}=CH_2$ with n-decylmethacrylate (0.4) | ¹ (0.6) | do | 120/100 |
| 28 | Copolymer of: $C_9F_{19}CH_2CH_2S\overset{\underset{\|}{O}}{C}-\overset{\underset{\|}{CH_3}}{C}=CH_2$ with cetyl vinyl ether (0.4) | ¹ (0.6) | do | 140/100 |

¹ Homopolymer of 3, 5, 5-trimethylhexyl methacrylate.

EXAMPLE 29

Using a pad bath comprising a mixture of (1) a latex comprising a copolymer of

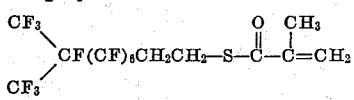

and octadecyl acrylate (0.4% solids in pad bath) and (2) a latex of 3,5,5-trimethylhexyl methacrylate homopolymer (0.6% solids in pad bath) and having present additives as in Example 21, cotton fabric was treated and the following repellency values obtained:

|  | Oil/water |
|---|---|
| Initial | 130/100 |
| 5 washes, no ironing | 120/70 |
| 5 washes and ironed | 130/90 |

As can be seen from the above examples, the composition of the invention gives excellent performance and in addition no adverse properties are imparted to the treated textiles which are odor free and of overall high quality.

When using a physical mixture of the sulfur containing fluorinated acrylate latex with a non-fluorinated acrylate latex as in the above example, the amount of the fluoropolymer latex will preferably be from about 10% to 60% by weight of solids of the total latices. When such mixtures are used and when the sulfur containing fluorinated acrylate latex is a copolymer, then the fluorine-free comonomer of the copolymer will generally be from about 0.5% to about 40% by weight of the total copolymer composition.

It will be understood, of course, that numerous variations and changes may be made from the above description and examples without departing from the spirit and scope of the invention.

We claim:
1. A polymer mixture of (a) at least about 10% by weight based on the weight of said mixture of a fluorinated polymer derived from the monomer of the structure

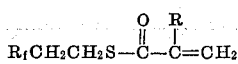

wherein $R_f$ is a perfluoroalkyl group containing from 7 to 11 carbon atoms, and R is selected from the group consisting of hydrogen and methyl, or a copolymer derived from at least about 60% by weight based on the weight of said copolymer of said fluorocarbon monomer and a fluorine-free acrylate or methacrylate monomer, and (b) at least about 40% by weight based on the weight of said mixture of a polymer or copolymer of a fluorine-free alkyl acrylate or methacrylate where the alkyl groups contain from about 4 to about 10 carbon atoms.

2. A polymer mixture of claim 1 where the fluorinated copolymer is a copolymer of

and stearyl methacrylate and the non-fluorinated polymer is a polymer of 3,5,5-trimethylhexyl methacrylate.

3. The polymer mixture of claim 1 where the fluorinated copolymer is a copolymer of

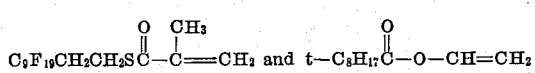

and the non-fluorinated polymer is a polymer of 3,5,5-trimethylhexyl methacrylate.

4. The polymer mixture of claim 1 where the fluorinated polymer is a copolymer of

and n-decyl methacrylate and the non-fluorinated polymer is a polymer of 3,5,5-trimethylhexyl methacrylate.

5. The polymer mixture of claim 1 where the fluorinated polymer is a copolymer of

and cetyl vinyl ether and the non-fluorinated polymer is a polymer of 3,5,5-trimethylhexyl methacrylate.

6. The polymer mixture of claim 1 where the fluorocarbon containing polymer is a copolymer of

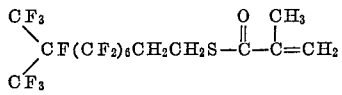

and octadecyl acrylate and where the non-fluorinated polymer is a polymer of 3,5,5-trimethylhexyl methacrylate.

7. A method of imparting oil and water repellent effects to textiles which comprises applying to the surface of said textile a polymer mixture of (a) at least about 10% by weight based on the weight of said mixture of a fluorocarbon polymer derived from the monomer of the structure $$CH_2CH_2SR_f\text{—}\overset{O}{\underset{\|}{C}}\text{—}\overset{R}{\underset{|}{C}}\text{=}CH_2$$

where $R_f$ is a perfluoroalkyl group containing 7 to 11 carbon atoms, and R is selected from the group consisting of hydrogen and methyl, or a copolymer derived from at least about 60% by weight based on the weight of said copolymer of said fluorocarbon monomer and a fluorine-free acrylate or methacrylate monomer, and (b) at least about 40% by weight based on the weight of said mixture of a polymer or copolymer of a fluorine-free alkyl acrylate or methacrylate where the alkyl groups contain from about 4 to about 10 carbon atoms.

8. The method of claim 7 where the fluorinated polymer is a polymer of

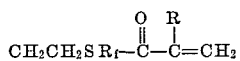

and stearyl methacrylate and the non-fluorinated polymer is a polymer of 3,5,5-trimethylhexylmethacrylate.

9. The method of claim 7 where the fluorinated polymer is a copolymer of

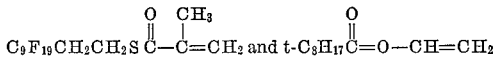

and the non-fluorinated polymer is a polymer of 3,5,5-trimethylhexylmethacrylate.

10. The method of claim 7 where the fluorinated polymer is a copolymer of

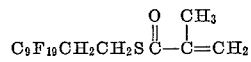

and n-decyl methacrylate and the non-fluorinated polymer is a polymer of 3,5,5-trimethylhexylmethacrylate.

11. The method of claim 7 where the fluorinated polymer is a copolymer of

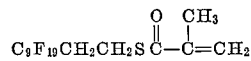

and cetyl vinyl ether and the non-fluorinated polymer is a polymer of 3,5,5-trimethylhexylmethocrylate.

12. The method of claim 7 where the fluorocarbon polymer is a copolymer of

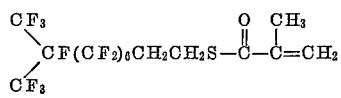

and octadecyl acrylate and where the non-fluorinated polymer is a polymer of 3,5,5-trimethylhexylmethacrylate.

References Cited
UNITED STATES PATENTS

| | | | |
|---|---|---|---|
| 3,256,231 | 6/1966 | Johnson et al. | 260—900X |
| 2,888,480 | 5/1959 | Neher et al. | 260—455C |
| 3,277,063 | 10/1966 | Harris | 260—79.7 |
| 3,385,812 | 5/1968 | Brachman | 260—29.6F |

MURRAY TILLMAN, Primary Examiner

H. ROBERTS, Assistant Examiner

U.S. Cl. X.R.

117—135.5, 139.5, 161; 260—29.6, 79.7, 455